UNITED STATES PATENT OFFICE.

GILBERT W. OLIVER, OF NEW YORK, N. Y., ASSIGNOR TO HENRY PARKER AND COLIN W. YALE, OF SAME PLACE.

IMPROVEMENT IN PRESERVING MEATS.

Specification forming part of Letters Patent No. 28,812, dated June 19, 1860.

*To all whom it may concern:*

Be it known that I, GILBERT W. OLIVER, of the city of New York, in the county of New York, in the State of New York, have invented a Means or Mode of Curing and Preserving Fresh Meats in Tropical Latitudes; and I do hereby declare that the following is a full and exact description thereof, to wit:

Section 1. I take meat (beef or pork) immediately after the animal is killed, while yet the animal heat remains, if practicable, and cut it into pieces, after the usual manner and size practiced in northern latitudes or colder climates for packing and curing by salt, and immediately immerse it in a saturated solution of chloride of sodium, (common salt,) of the kind generally used for curing meats, to which is added sugar or West India molasses, nitrate of potassa, (saltpeter,) and saleratus (or the bicarbonate of soda) in such proportions as is hereinafter stated, (see Sec. 2,) heated and kept at a temperature of 212° Fahrenheit, and in which it is allowed to remain from three (3) to five (5) minutes, (depending upon the size of the piece so immersed,) or sufficiently long for the heat to penetrate the meat and effectually coagulate the albumen of its tissues and fluids.

Sec. 2. It is then removed from the heated solution and loosely packed in strong, tight, suitable barrels, with a sufficiency of common salt (such as is generally used for similar purposes) alternating with each layer of meat. The barrel is then to be headed up and completely filled with the brine in which it (the meat) has been immersed, or, instead of it, a saturated solution of the common salt at a temperature of 212° Fahrenheit, to which is added, for every two hundred pounds of the meat, three (3) quarts of molasses (it may be varied a little, more or less) and from four (4) to eight (8) ounces each of nitrate of potassa (saltpeter) and saleratus or the bicarbonate of soda, and set aside to cool. In this condition the meat may remain until cured; or after three or four days it may be removed and more closely packed in other or the same barrels.

Sec. 3. The salt which is used in the packing (see Sec. 2) should be also heated, so as not too rapidly to cool the meat or the brine with which the barrel is filled; and for convenience' sake the solution in which the meat is first immersed (see Sec. 1) may contain a large excess of the salt which may be used for this purpose. The quantity of salt used (see Sec. 2) need not, perhaps, exceed one-half a bushel—simply a sufficiency—so that some excess will remain after the meat has absorbed what it naturally will.

What I claim as my invention or discovery, and desire to secure by Letters Patent, is—

The application or employment of heat to the specific purpose of curing and preserving meats, as corned provisions, (in such a way and to such an extent as will effectually or sufficiently coagulate the albumen of the tissues and fluids,) in combination with the subsequent application of heated brine or preservative fluid.

G. W. OLIVER.

Witnesses:
T. STUYVESANT,
JOHN D. WRIGHT.